United States Patent
Chang et al.

(10) Patent No.: US 10,246,807 B2
(45) Date of Patent: Apr. 2, 2019

(54) COMPOSITE WARM-KEEPING TEXTILE STRUCTURE AND METHOD FOR MANUFACTURING THE SAME

(71) Applicant: J. ADAMS & ASSOCIATES LTD., Taipei (TW)

(72) Inventors: Yung-Sheng Chang, Taipei (TW); Yi-Chung Hwang, Taipei (TW)

(73) Assignee: J. ADAMS & ASSOCIATES LTD., Taipei (TW)

( * ) Notice: Subject to any disclaimer, the term of this patent is extended or adjusted under 35 U.S.C. 154(b) by 394 days.

(21) Appl. No.: 14/994,968

(22) Filed: Jan. 13, 2016

(65) Prior Publication Data

US 2017/0198415 A1 Jul. 13, 2017

(51) Int. Cl.
*D01F 6/92* (2006.01)
*D05B 3/00* (2006.01)
*D05B 11/00* (2006.01)
*A41D 31/00* (2019.01)

(52) U.S. Cl.
CPC .......... *D05B 11/00* (2013.01); *A41D 31/0038* (2013.01); *B32B 2250/20* (2013.01)

(58) Field of Classification Search
CPC .......... D01F 6/92; D05B 3/00; D10B 2501/00
USPC ....... 428/292.1, 108, 110, 111, 196; 264/112
See application file for complete search history.

(56) References Cited

U.S. PATENT DOCUMENTS 3,025,199 A * 3/1962 Harwood ............... B01D 39/18
156/1

* cited by examiner

*Primary Examiner* — Camie S Thompson
(74) *Attorney, Agent, or Firm* — Muncy, Geissler, Olds & Lowe, P.C.

(57) ABSTRACT

A method for manufacturing a composite warm-keeping textile structure includes the steps of: applying an elastic gripper-puffing mechanism to perform puffing operations upon opened cotton fibers for forming at least one puffy fiber agglomerate; applying the elastic gripper-puffing mechanism to grab unit fiber agglomerates from the puffy fiber agglomerate and further to drop the unit fiber agglomerates onto a first cloth layer on an operational platform; vibrating the operational platform to have the unit fiber agglomerates to be evenly distributed over the first cloth layer, so that the unit fiber agglomerates are formed as a fiber agglomerate distribution layer adhered onto the first cloth layer; and, having a second cloth layer to cover the fiber agglomerate distribution layer, so that the first cloth layer and the second cloth layer clamps together the fiber agglomerate distribution layer in between to form the composite warm-keeping textile structure.

11 Claims, 17 Drawing Sheets

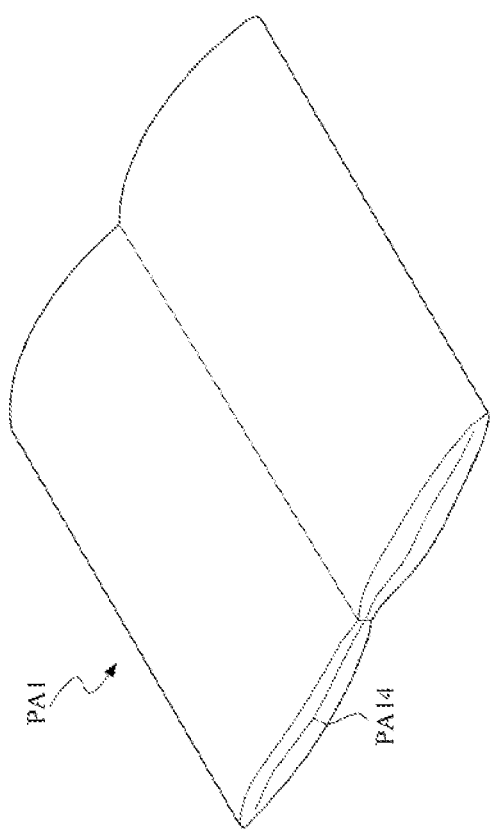

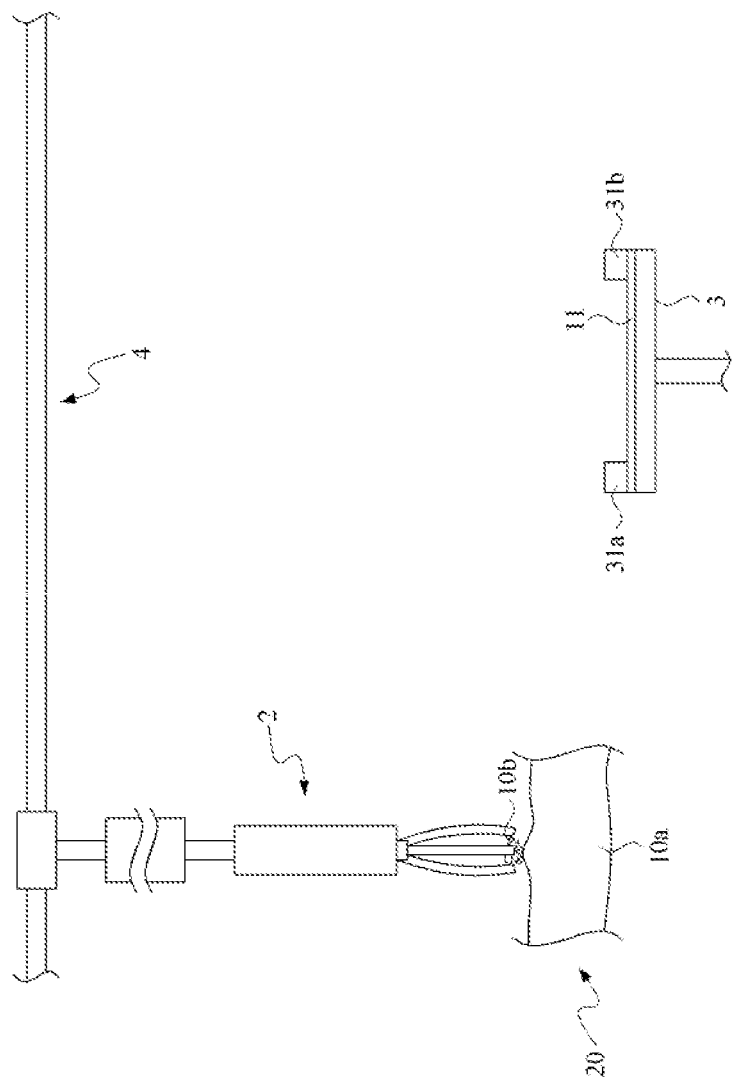

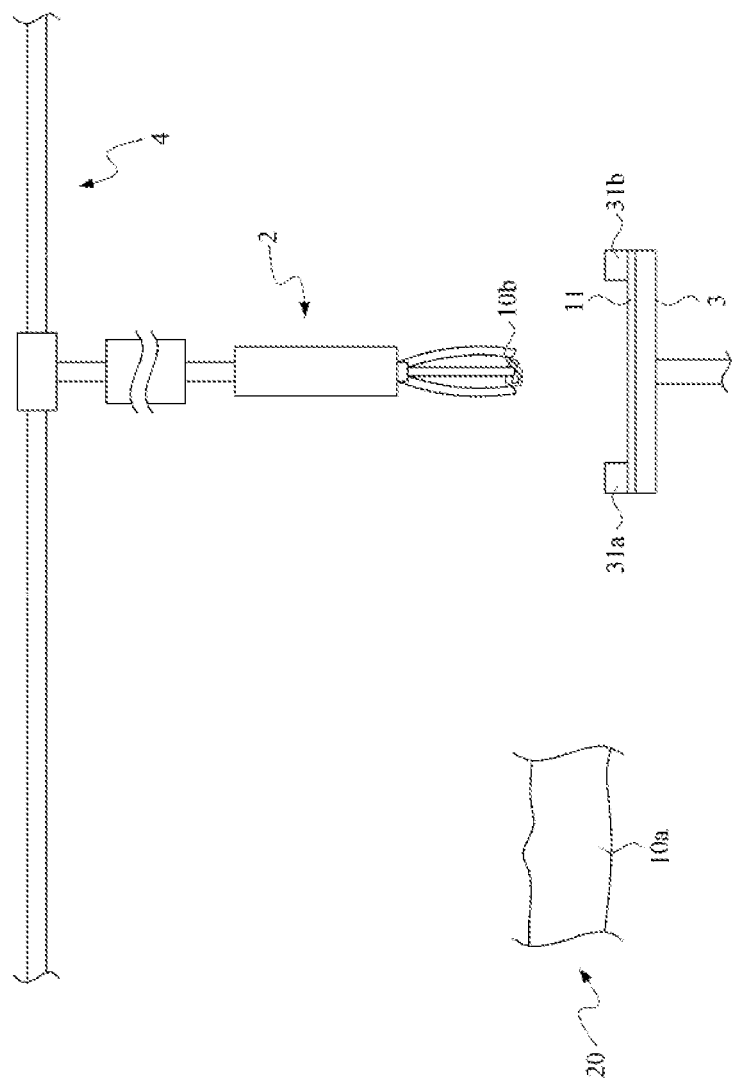

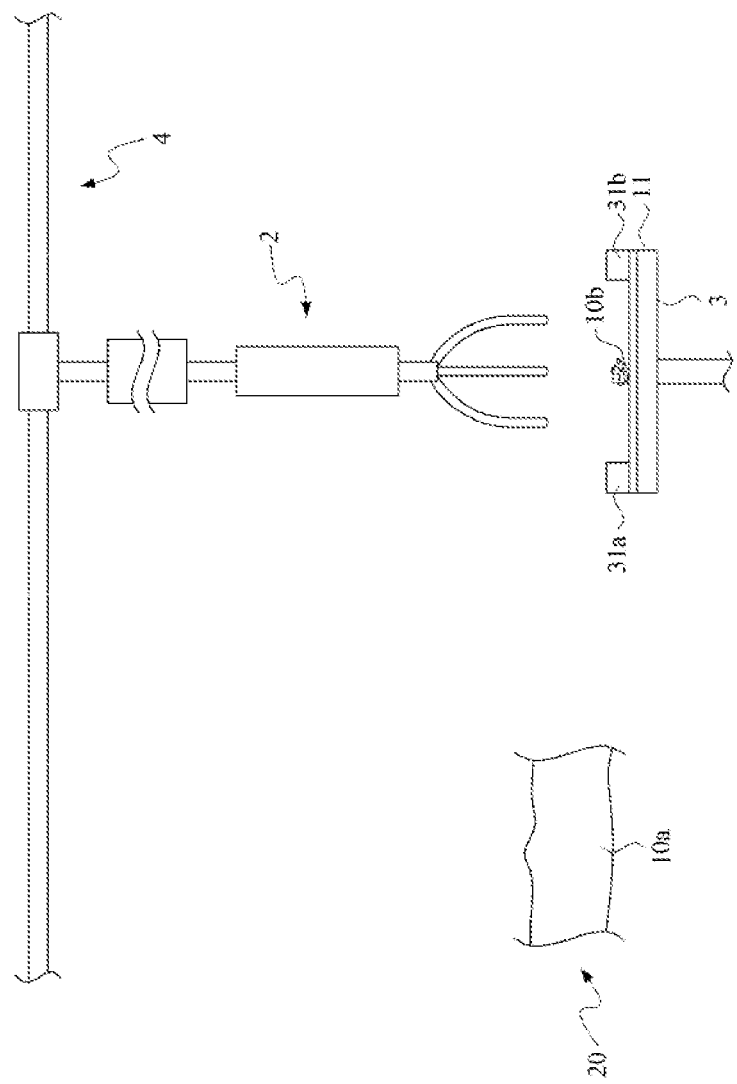

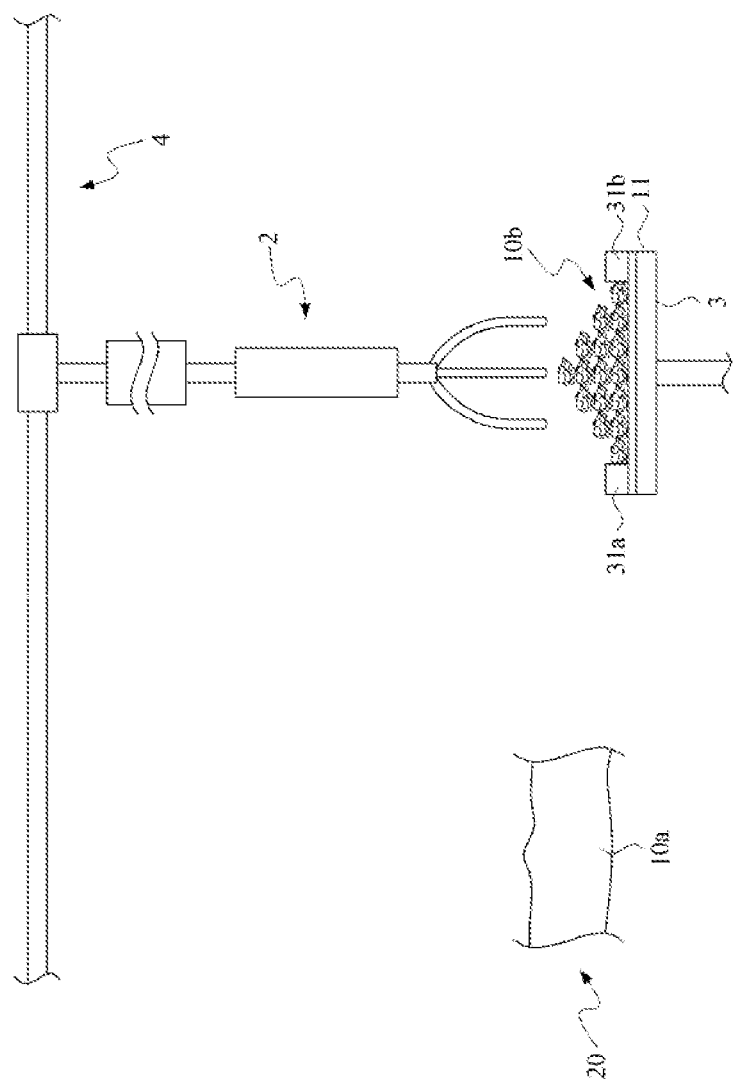

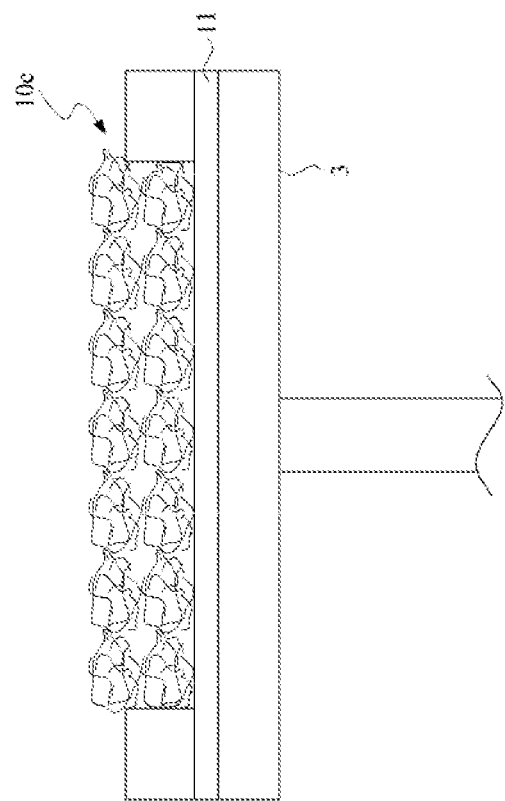

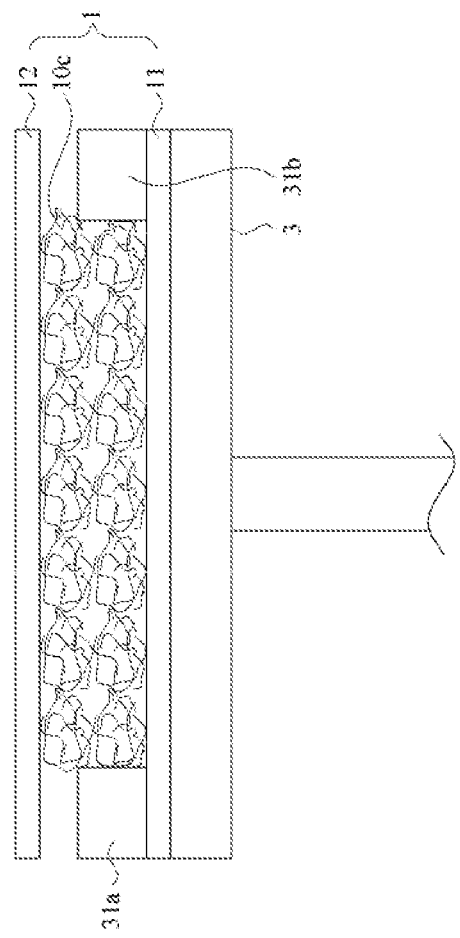

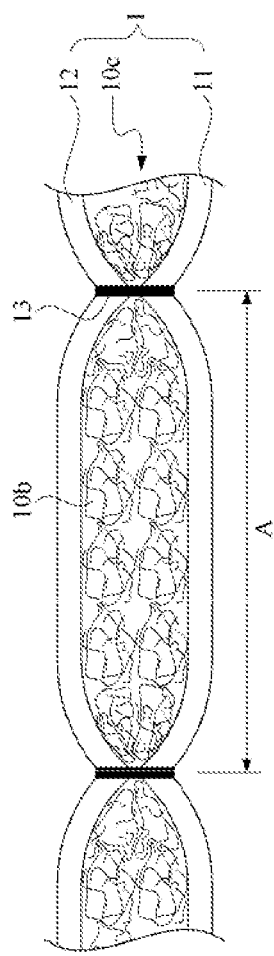

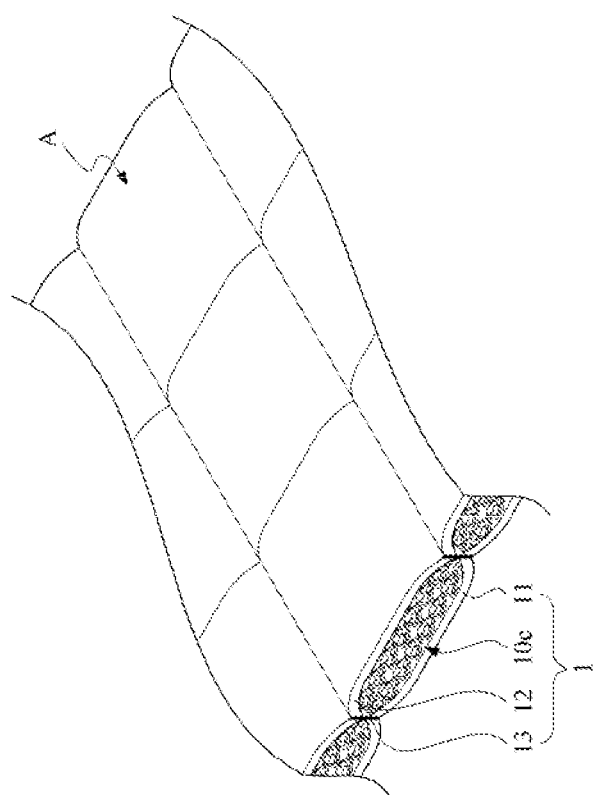

COMPOSITE WARM-KEEPING TEXTILE STRUCTURE AND METHOD FOR MANUFACTURING THE SAME

BACKGROUND OF INVENTION

1. Field of the Invention

The invention relates to a warm-keeping textile structure and a method for manufacturing the same, and more particularly to the product and the accompanying manufacturing method for the composite warm-keeping textile structure that is consisted of two layers of cloth materials and fiber agglomerates to be clamped between these two layers of the cloth materials.

2. Description of the Prior Art

In human history, exact timing for appearance of clothes is too early to be precisely located. Incentives for the human to use the clothes might be a simple reason of religions, locations or cultures. The clothes can provide both figure-modification and good-looking, but the most important usage of clothes is the protection it provides, to protect from sunburn and cold weathers. In particular, in order to live in cold areas in the planet, people develop versatile cold-weather clothes. Among these developments, one thereof is to use a textile that consists of two layers of cloths and warm-keeping fibers filled between these two layers. Since the air is not a good thermal conductor, and in order to keep more air inside this stuffed textile, the warm-keeping fibers filled between these two cover cloths shall sustain a sufficient space in between for providing well porosity so as to accommodate enough air thereinside. These warm-keeping fibers can be down, cottons or the like.

Refer now to FIG. 1A and FIG. 1B. In FIG. 1A, it is shown that, in the conventional design, while in producing the fiber-filling textile structure, an opening for feeding the fibers shall be prepared in advance. In FIG. 1B, it shows that the opening needs to be sewed up after the feeding of the fibers is done. As shown, the method for manufacturing the conventional fiber-filling textile structure is firstly to laminate a first coating cloth PA11 and a second coating cloth PA12. Then, the laminated first coating cloth PA11 and second coating cloth PA12 is machine sewed to generate a plurality of fiber-filling areas PA10, in which each of these fiber-filling areas PA10 includes an unsewed edge PA101 for forming a fiber-filling opening PA102 to the corresponding fiber-filling area PA10. A plurality of filling-fiber agglomerates PA13 is then fed into the fiber-filling area PA1 via the corresponding fiber-filling opening PA102 so as to form the porous interiors. Finally, the unsewed edge PA101 is sewed up to form a fiber-filling textile structure PA1.

Hence, the conventional fiber-filling textile structure PA1 is thus to include a first coating cloth PA11 a stuffed layer, a second coating cloth PA12 and at least one machine sewing thread PA14. The stuffed layer is consisted of filling-fiber agglomerates PA13 to be filled between the first coating cloth PA11 and the second coating cloth PA12. The machine sewing thread PA14 rides across the first coating cloth PA11, the stuffed layer and the second coating cloth PA12 so as to define a plurality of fiber-filling areas PA10.

While in feeding a plurality of filling-fiber agglomerates PA13 into the fiber-filling area PA10 via the corresponding fiber-filling opening PA102, a push force is exerted to push the filling-fiber agglomerates PA13 already inside the fiber-filling area PA10 to move further inside so as to accommodate the new-fed filling-fiber agglomerates PA13 into the fiber-filling area PA10. However, while in exerting the push force, the filling-fiber agglomerates PA13 already inside the fiber-filling area PA10 would be squeezed to lose the porosity, and thus the worm-keeping capacity of the fiber-filling textile structure PA1 would be reduced.

In addition, while in stuffing the filling-fiber agglomerates PA13 into the fiber-filling area PA10, if the filling-fiber agglomerates PA13 are over fed, the fiber-filling textile structure PA1 would be over stuffed. If the filling-fiber agglomerates PA13 are less stuffed, then the fiber-filling textile structure PA1 would be too soft. Further, while in stuffing the filling-fiber agglomerates PA13, the uniformity of the filling-fiber agglomerates PA13 inside the fiber-filling area PA10 would be hard to be controlled, which will make the appearance of clothes using the fiber-filling textile structure PA1 to be out of control.

SUMMARY OF THE INVENTION

In the conventional manufacturing method for the fiber-filling textile structures, the warm-keeping capacity of the fiber-filling textile structure would be hard to be further elevated. While the filling-fiber agglomerates are fed into the fiber-filling area, the porosity of the filling-fiber agglomerates would be hard to be controlled. Further, the feeding amount and the uniformity of the filling-fiber agglomerates inside the fiber-filling area are also hard to be controlled, and thus the appearance of clothes using the fiber-filling textile structure PA1 would be far from being controllable.

Accordingly, it is the primary object of the present invention to provide a composite warm-keeping textile structure and a method for manufacturing the same. Firstly, an elastic gripper-puffing mechanism is applied to perform a plurality of puffing operations upon a plurality of opened cotton fibers in a puffing work area so as to form at least one puffy fiber agglomerate. Namely, the elastic gripper-puffing mechanism performs several the puffing operations upon the opened cotton fiber so as to disturb the opened cotton fibers to form the puffy fiber agglomerate generate with more interior holes or space.

Then, apply the elastic gripper-puffing mechanism to grab a plurality of unit fiber agglomerates from the puffy fiber agglomerate and further to drop the plurality of unit fiber agglomerates onto a first cloth layer prepared on an operational platform. Namely, the unit fiber agglomerate from the puffy fiber agglomerate is grabbed by the elastic gripper-puffing mechanism, and the elastic gripper-puffing mechanism further drops the unit fiber agglomerate onto a first cloth layer on the operational platform.

Then, vibrate the operational platform so as to have the plurality of unit fiber agglomerates to be evenly distributed over the first cloth layer, so that the plurality of unit fiber agglomerates is formed as a fiber agglomerate distribution layer adhered onto the first cloth layer. Namely, a plurality of unit fiber agglomerates is vibrated by the operational platform so as to evenly distribute the unit fiber agglomerates and so as further to form the fiber agglomerate distribution layer.

Finally, have a second cloth layer to cover and be adhered to the fiber agglomerate distribution layer, so that the first cloth layer and the second cloth layer clamps together the fiber agglomerate distribution layer in between to forming a composite warm-keeping textile structure. Precisely, the first cloth layer and the second cloth layer are to sandwich the fiber agglomerate distribution layer without changing the bulkiness and porosity.

In one embodiment of the present invention, machine sewing is applied to the composite warm-keeping textile structure, and at least one machine sewing thread is generated to divide the composite warm-keeping textile structure into a plurality of fiber agglomerate distribution regions. The purpose of the separate fiber agglomerate distribution regions is to confine the unit fiber agglomerates in a specific small region so as to preserve the evenness of the fiber agglomerate distribution layer.

In the present invention, before performing the puffing operation, an elastic gripper-puffing mechanism having an gripper-limiting member and a movable assembly shall be mounted in advance. The gripper-limiting member has a gripper-limiting opening, and the movable assembly includes a displacement shaft and a plurality of spring grippers connected to an end of the displacement shaft and defining a gripping area.

Then, the gripper-limiting member or the displacement shaft is driven to have the displacement shaft to undergo a relative motion with respect to the gripper-limiting member along a displacement path passing through the gripper-limiting opening. The displacement path includes a material-gripping stroke and a material-releasing stroke. Alternatively, the gripper-limiting member or the displacement shaft is driven to have the gripper-limiting member to undergo a relative motion with respect to the displacement shaft along the displacement path passing through the gripper-limiting opening.

Then, while the displacement shaft undergoes the material-gripping stroke, the gripper-limiting member increases bending deformations of the spring grippers so as to approach the spring grippers toward the gripping area and to grab the opened cotton fibers in the puffing work area. While the spring grippers grab the opened cotton fibers in the puffing work area, the opened cotton fiber would entangle with the spring grippers.

Then, while the displacement shaft undergoes the material-releasing stroke, the gripper-limiting member decreases the bending deformations of the spring grippers so as to open the spring grippers away the gripping area and to pull apart the opened cotton fibers. Namely, by opening the spring grippers, the opened cotton fibers entangled at the spring grippers would be pulled apart further so as to increase the bulkiness and porosity. Finally, the aforesaid steps are repeatedly performed several times so as to perform a plurality of the puffing operations.

While in mounting the elastic gripper-puffing mechanism, a driving module of the elastic gripper-puffing mechanism is connected with at least one of the gripper-limiting member and the displacement shaft. The driving module for performing relative motions between the driving gripper-limiting member and the displacement shaft is one of a hydraulic tank, a pneumatic cylinder, a robot arm or the like able to drive the gripper-limiting member or the movable assembly.

Further, the motion of the gripper-limiting member and/or the displacement shaft is driven by the driving module, so that the gripper-limiting member or the displacement shaft can displace along the displacement path. Namely, the relative motion between the gripper-limiting member and the displacement shaft along the displacement path is driven by the driving module.

In addition, in order to place the unit fiber agglomerate onto the first cloth layer on the operational platform, a guide mechanism is applied to guide the elastic gripper-puffing mechanism to move to a position over the operational platform so as to allow the plurality of unit fiber agglomerates to be dropped onto the first cloth layer.

By applying the aforesaid method of the present invention, the composite warm-keeping textile structure can include a first cloth layer, a fiber agglomerate distribution layer, a second cloth layer and at least one machine sewing thread. The fiber agglomerate distribution layer is adhered to the first cloth layer, and consists of a plurality of unit fiber agglomerates. The second cloth layer adhered to the fiber agglomerate distribution layer is to sandwiched the fiber agglomerate distribution layer between the first cloth layer and the second cloth layer. It is noted that the first cloth layer and the second cloth layer exist in a manner of maintaining the bulkiness and porosity of the fiber agglomerate distribution layer, so that the fiber agglomerate distribution layer can be compactly clamped in between.

In addition, the composite warm-keeping textile structure further includes at least one machine sewing thread for dividing a combination of the first cloth layer, the fiber agglomerate distribution layer and the second cloth layer into a plurality of fiber agglomerate distribution regions.

It is noted that the unit fiber agglomerate is formed by a plurality of cellosilk entangling together. Thereupon, the porosity among the cellosilk inside the unit fiber agglomerate can be increased, so that the warm-keeping capability for the composite warm-keeping textile structure can be optimally preserved.

Additionally, the cellosilk can be a hollow polyester cellosilk that is easier to be obtained and the hollow structure thereof can increase the air content. Also, the cellosilk is preferred to have a length ranging from 3 to 15 centimeters, and to be a short fiber.

In summary, the composite warm-keeping textile structure and the method for manufacturing the composite warm-keeping textile structure provided by the present invention is to introduce the elastic gripper-puffing mechanism to perform the puffing operation upon the opened cotton fiber, so that the puffy fiber agglomerate can be formed. Further, by using the elastic gripper-puffing mechanism to grab and the drop the puffy fiber agglomerate, the unit fiber agglomerate can be formed and can be placed on the first cloth layer prepared on the operational platform. In addition, by vibrating the operational platform to evenly distribute the unit fiber agglomerates on the first cloth layer, the fiber agglomerate distribution layer can be uniformly prepared. Finally, the second cloth layer covers and is adhered to the fiber agglomerate distribution layer so as to complete the sandwiching, in a lamination form, of the first cloth layer, the fiber agglomerate distribution layer, and the second cloth layer, such that the composite warm-keeping textile structure is formed. Further, the composite warm-keeping textile structure can be stored and moved (to the machine sewing area) in a reel manner, and then can be machine sewed into a plurality of fiber agglomerate distribution regions by the at least one machine sewing module.

By comparing to the prior art, the composite warm-keeping textile structure and the method for manufacturing method the same product utilize the elastic gripper-puffing mechanism to perform the puffing operation upon the opened cotton fibers so as thereby to increase the bulkiness and porosity of the opened cotton fibers. Thereupon, the air amount contained in the opened cotton fibers can be increased. Further, by vibrating or providing perturbations to the operational platform, the unit fiber agglomerate thereon can be evenly distributed to form the fiber agglomerate distribution layer without the harmful squeezing. In the circumstance of preserving the bulkiness and porosity in the fiber agglomerate distribution layer, the second cloth layer can be adhered over the fiber agglomerate distribution layer. By having the composite warm-keeping textile structure to be reeled for storage and moving, the bulkiness and porosity of the fiber agglomerate distribution layer can again be well preserved without further squeezing to harm this warm-keeping feature of the present invention By introducing the aforesaid composite warm-keeping textile structure in accordance with the present invention, the shortcomings of the prior art described in the background section can be resolved by waiving possible squeezing in forming the fiber-filling textile structure which would reduce the bulkiness and porosity of the textile. In addition, by providing the puffing operation and vibrating at the operational platform, the problem of unevenness in forming the fiber-filling textile structure and further that of patterning the clothes using the textile structure can be successfully eliminated.

All these objects are achieved by the composite warm-keeping textile structure and the method for manufacturing the same described below.

BRIEF DESCRIPTION OF THE DRAWINGS

The present invention will now be specified with reference to its preferred embodiment illustrated in the drawings, in which:

FIG. 1B demonstrates a state of FIG. 1A that the opening is sewed up;

FIG. 3A shows schematically a state of the embodiment of FIG. 2A that the elastic gripper-puffing mechanism is taking out a unit fiber agglomerate;

FIG. 3B shows schematically a state of the embodiment of FIG. 2A that, after the guide mechanism guides the elastic gripper-puffing mechanism to take out the unit fiber agglomerate, the guide mechanism is guided to a position over the operational platform;

FIG. 3C shows schematically a state of the embodiment of FIG. 2A that the unit fiber agglomerate is placed on the first cloth layer positioned on the operational platform;

FIG. 3D shows schematically a state of the embodiment of FIG. 2A that a plurality of unit fiber agglomerates is placed on the first cloth layer positioned on the operational platform;

FIG. 4B demonstrates the unit fiber agglomerates on the operational platform forming a fiber agglomerate distribution layer after the vibrating of the operational platform;

FIG. 5 demonstrates schematically that a second cloth layer is to cover the fiber agglomerate distribution layer of FIG. 4B;

FIG. 6C shows a state of the composite warm-keeping textile structure after the machine sewing of FIG. 6B; and FIG. 6D shows schematically a perspective view of FIG. 6C.

DESCRIPTION OF THE PREFERRED EMBODIMENT

The invention disclosed herein is directed to a composite warm-keeping textile structure and a method for manufacturing the composite warm-keeping textile structure. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1A:
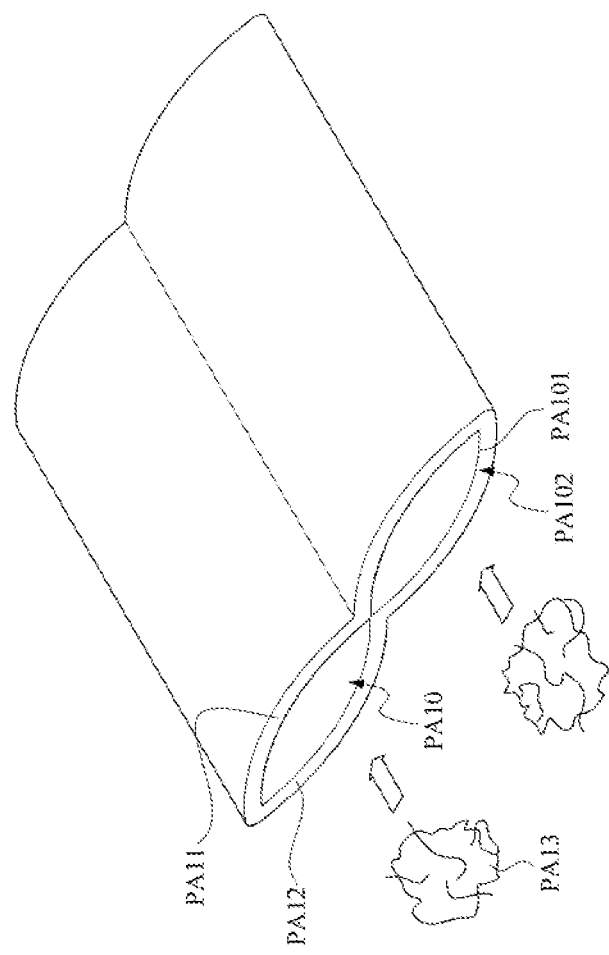
FIG. 1A demonstrates schematically that, in the conventional design, while in producing the fiber-filling textile structure, an opening for feeding the fibers shall be prepared in advance.
Figure 2A:
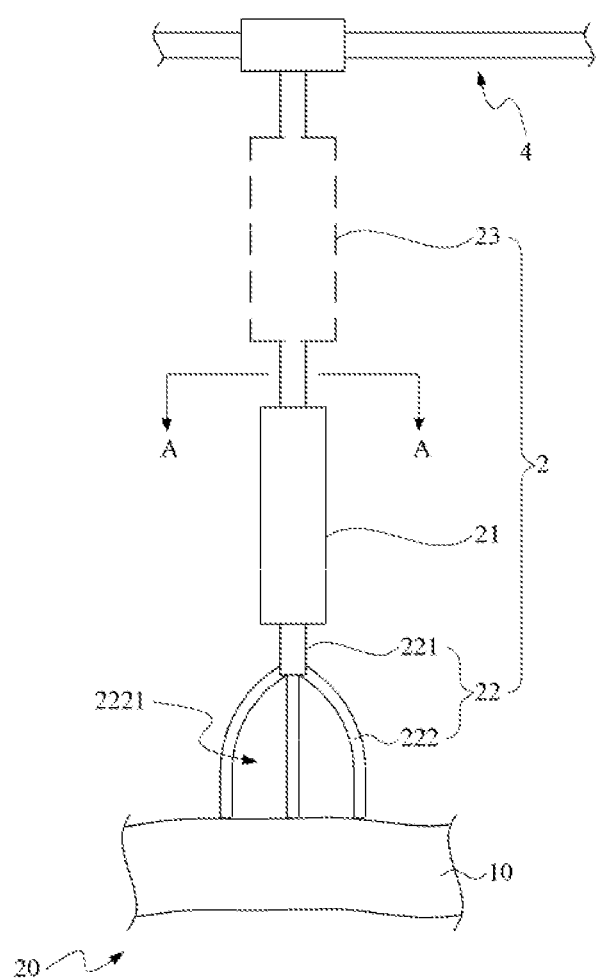
FIG. 2A is a schematic view of the preferred embodiment in accordance with the present invention, in which the position relationship among the elastic gripper-puffing mechanism, the guide mechanism and the opened cotton fibers for manufacturing the composite warm-keeping textile structure is shown.
Figure 2B:
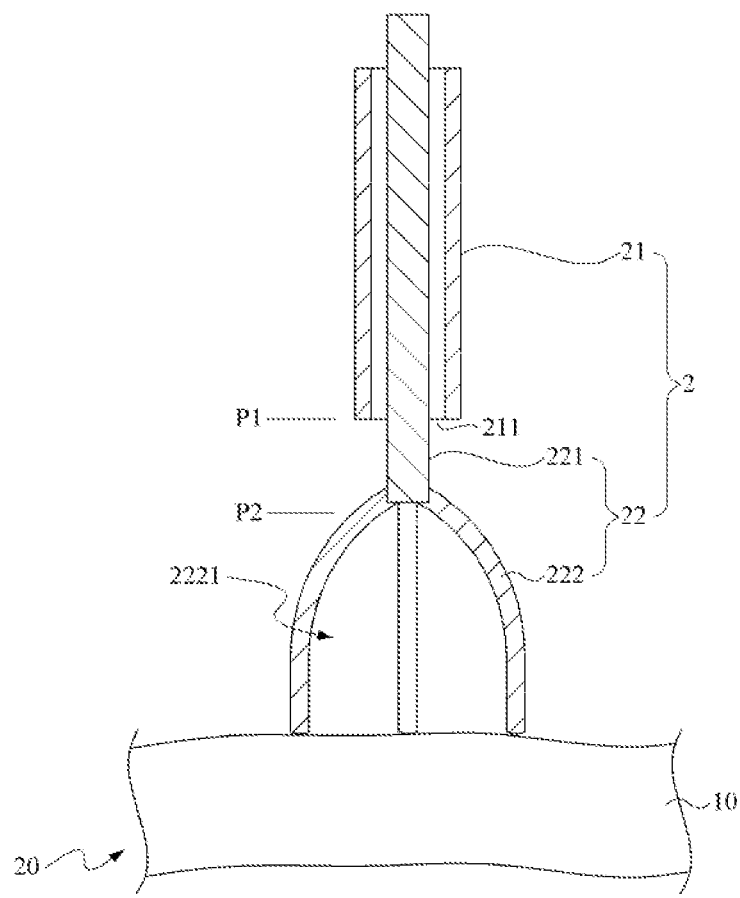
FIG. 2B is a cross sectional view of FIG. 2A along line A-A to show particularly the embodiment of FIG. 2A in a state of the elastic gripper-puffing mechanism performing a material-releasing stroke.
Figure 2C:
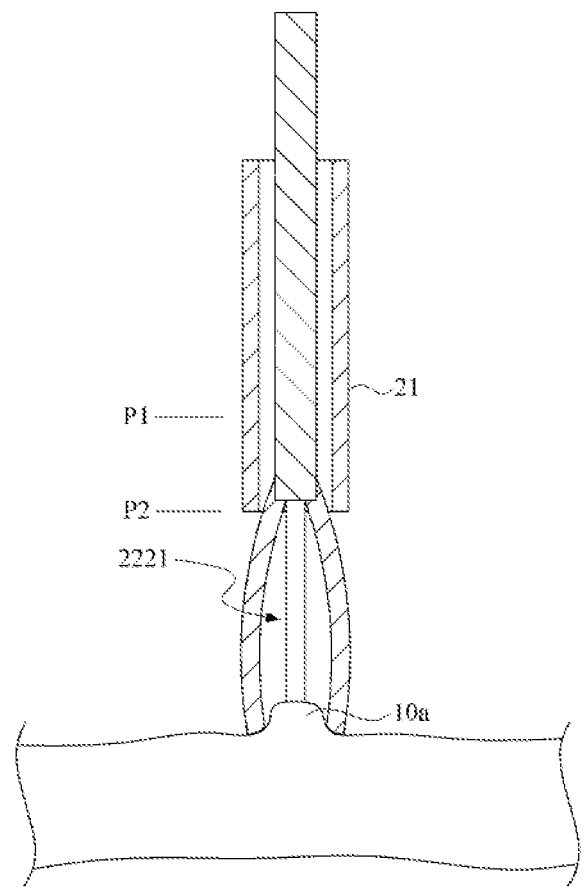
FIG. 2C is a cross sectional view of FIG. 2A along line A-A to show particularly the embodiment of FIG. 2A in a state of the elastic gripper-puffing mechanism performing a material-gripping stroke.

Refer now to FIG. 2A, FIG. 2B and FIG. 2C; where FIG. 2A is a schematic view of the preferred embodiment in accordance with the present invention, in which the position relationship among the elastic gripper-puffing mechanism, the guide mechanism and the opened cotton fibers for manufacturing the composite warm-keeping textile structure is shown; FIG. 2B is a cross sectional view of FIG. 2A along line A-A to show particularly the embodiment of FIG. 2A in a state of the elastic gripper-puffing mechanism performing a material-releasing stroke; and, FIG. 2C is a cross sectional view of FIG. 2A along line A-A to show particularly the embodiment of FIG. 2A in a state of the elastic gripper-puffing mechanism performing a material-gripping stroke. As shown, an elastic gripper-puffing mechanism 2 is firstly arranged to perform a plurality of puffing operations upon a plurality of opened cotton fibers 10 in a puffing work area 20 so as to form at least one puffy fiber agglomerate 10a. That is to say that the elastic gripper-puffing mechanism 2 is set to perform puffing operations upon the opened cotton fibers 10 so as to make more turbulence to the opened cotton fibers 10 and to increase the porosity to form the puffy fiber agglomerate 10a.

In the present invention, an elastic gripper-puffing mechanism 2 mounted on a guide mechanism 4 includes a gripper-limiting member 21, a movable assembly 22 and a driving module 23, in which the gripper-limiting member 21 further has a gripper-limiting opening 211. In the present invention, the gripper-limiting member 21 consisted of a limiting ring and a limiting tube is a conventional design and thus details thereabout would be omitted herein. The movable assembly 22 includes a displacement shaft 221 and a plurality of spring grippers 222 connected to an end (the lower end in the figure) of the displacement shaft 221. The spring grippers 222 are together to define a gripping area 2221. The driving module 23 connected to the gripper-limiting member 21 or the displacement shaft 22 can be a hydraulic tank, a pneumatic cylinder, a robot arm or any that can be applied to drive the gripper-limiting member 21 or the movable assembly 22.

The driving module 23 for driving the gripper-limiting member 21 and the displacement shaft 221 can allow relative movements between the gripper-limiting member 21 and the displacement shaft 221. While a relative movement occurs between the gripper-limiting member 21 and the displacement shaft 221, the displacement shaft 221 is to move with respect to the gripper-limiting member 21 by sliding longitudinal along a displacement path passing through the gripper-limiting opening 211. The displacement path can include a material-gripping stroke and a material-releasing stroke.

In the present invention, to make possible the aforesaid movements, the displacement shaft 221 can be kept stationary but sliding the gripper-limiting member 21, the gripper-limiting member 21 can be kept stationary but sliding the displacement shaft 221, or both of the gripper-limiting member 21 and the displacement shaft 221 can move in different speeds.

Further, by having the driving module 23 to drive the gripper-limiting member 21 or the displacement shaft 221 to move along the displacement path, the driving module 23 can drive the gripper-limiting member 21 so as to have the gripper-limiting opening 211 to displace from a first position P1 to a second position P2 along the displacement path. Alternatively, the driving module 23 can also move the gripper-limiting member 21 so as to displace the gripper-limiting opening 211 from the second position P2 to the first position P1 reversely along the displacement path.

Then, while the displacement shaft 221 undergoes the material-gripping stroke, the elastic constraint forcing between the gripper-limiting member 21 and the spring gripper 222 would increase the bending deformation of the spring gripper 222 so as to approach the spring grippers 222 together toward the gripping area 2221 and thus to grab the opened cotton fibers 10 in the puffing work area 20. In the present invention, while the spring grippers 222 grab the opened cotton fibers 10 in the puffing work area 20, the opened cotton fibers 10 would be entangled with the spring grippers 222.

Then, while the displacement shaft 221 undergoes the material-releasing stroke, the bending deformation of the spring grippers 222 forced by the gripper-limiting member 21 would decrease so that the spring grippers 222 would be opened to be away the gripping area 2221 and thus to release the opened cotton fibers 10. Namely, by opening the spring grippers 222, the opened cotton fibers 10 entangled at the spring grippers 222 would be pulled apart so that the puffy-ness and the porosity of the opened cotton fibers 10 would be increased. Thereby, a puffy fiber agglomerate 10a is formed. Finally, repeat the aforesaid steps several times so as to complete the plural operations defined as a plurality of puffing operations in accordance with the present invention.

Refer now also to FIG. 3A through FIG. 3D; where FIG. 3A shows schematically a state of the embodiment of FIG. 2A that the elastic gripper-puffing mechanism is taking out a unit fiber agglomerate, FIG. 3B shows schematically a state of the embodiment of FIG. 2A that, after the guide mechanism guides the elastic gripper-puffing mechanism to take out the unit fiber agglomerate, the guide mechanism is guided to a position over the operational platform, FIG. 3C shows schematically a state of the embodiment of FIG. 2A that the unit fiber agglomerate is placed on the first cloth layer positioned on the operational platform, and FIG. 3D shows schematically a state of the embodiment of FIG. 2A that a plurality of unit fiber agglomerates is placed on the first cloth layer positioned on the operational platform.

As shown, the elastic gripper-puffing mechanism 2 is to grab a plurality of unit fiber agglomerates 10b from the puffy fiber agglomerates 10a and to displace the unit fiber agglomerate 10b onto a first cloth layer prepared on an operational platform 3. Namely, the unit fiber agglomerate 10b is grabbed away from the puffy fiber agglomerates 10a by the elastic gripper-puffing mechanism 2, and then the elastic gripper-puffing mechanism 2 drops the unit fiber agglomerate 10b onto the first cloth layer 11 on the operational platform 3. In addition, the first cloth layer 11 can be fixed on the operational platform 3 by the depressing strips 31a, 31b.

It is worthy to note that the guide mechanism 4 is introduced to guide the moving of the elastic gripper-puffing mechanism 2 all the way to be a predetermined position over the operational platform 3, where the plurality of the grabbed unit fiber agglomerates 10b can be placed or dropped on the first cloth layer 11. In particular, the elastic gripper-puffing mechanism 2 is to drop the plurality of unit fiber agglomerates 10b onto the first cloth layer 11 in a free release manner In the present invention, the guide mechanism 4 can be a power sliding module for displacing purposely the elastic gripper-puffing mechanism 2 back and forth between the puffing work area 20 and the operational platform 3.

Figure 3E:
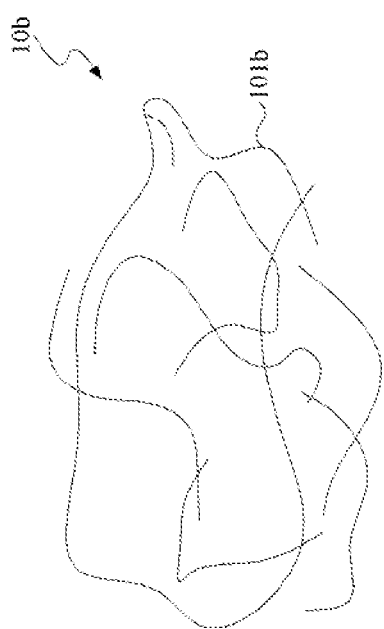
FIG. 3E shows schematically the unit fiber agglomerate taken out by the elastic gripper-puffing mechanism of the embodiment of FIG. 2A.

FIG. 3E shows schematically the unit fiber agglomerate taken out by the elastic gripper-puffing mechanism of the embodiment of FIG. 2A. As shown, since the unit fiber agglomerate 10b is formed as a plurality of cellosilks 101b (a cluster of entangled fibers), thus the porosity among the cellosilks 101b inside the unit fiber agglomerate 10b can be increased. Thus, the warm-keeping capability of the composite warm-keeping textile structure 1 consisted of unit fiber agglomerates 10b can be optimally ensured. In the present invention, the cellosilk 101b can be a hollow polyester cellosilk and a short fiber structure easier to form the unit fiber agglomerate 10b. Preferably, the cellosilk 101b has a length ranging between 3 to 15 centimeters.

Figure 4A:
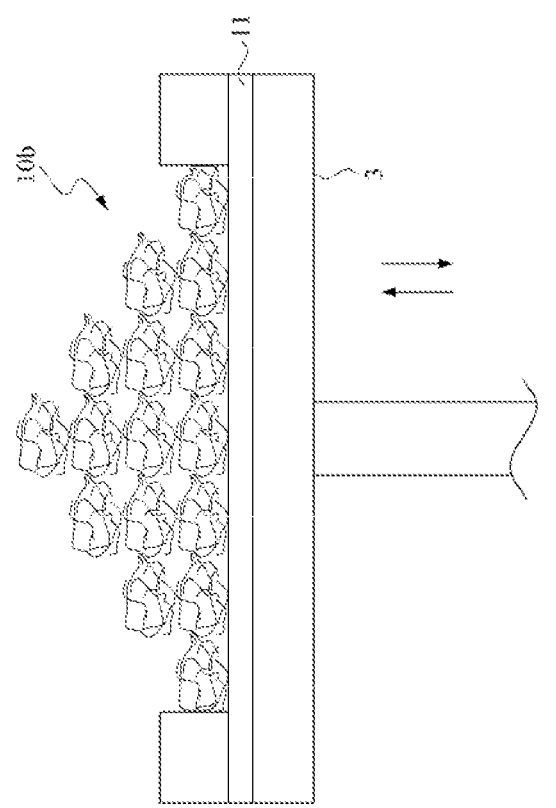
FIG. 4A demonstrates the unit fiber agglomerates on the operational platform in a state before a vibrating of the operational platform.

Furthermore, refer also to FIG. 4A and FIG. 4B; where FIG. 4A demonstrates the unit fiber agglomerates on the operational platform in a state before vibrating of the operational platform, and FIG. 4B demonstrates the unit fiber agglomerates on the operational platform forming a fiber agglomerate distribution layer after vibrating the operational platform. As shown, while a disturbance, perturbation or vibration is applied to the operational platform 3, the unit fiber agglomerates 10b on the first cloth layer 11 would be distributed much more evenly or uniformly, so that the unit fiber agglomerates 10b can be better to form a fiber agglomerate distribution layer 10c adhered to the first cloth layer 11. In addition, by vibrating the platform 3, a plurality of unit fiber agglomerates 10b on the operational platform 3 can be vibrated, rotationally and/or linearly, to shift back and forth substantially vertically, horizontally and in an arbitrary direction. Upon such an arrangement, the distribution of the unit fiber agglomerates 10b can be made more evenly and smoother so that a perfect fiber agglomerate distribution layer 10c can be formed.

Referring now to FIG. 5, a second cloth layer to cover the fiber agglomerate distribution layer of FIG. 4B is schematically shown. The second cloth layer 12 is to cover and then is adhered to the fiber agglomerate distribution layer 10c so as to clamp the fiber agglomerate distribution layer 10c together with the first cloth layer 11 for forming the composite warm-keeping textile structure 1 of the present invention. Precisely, the first cloth layer 11 and the second cloth layer 12 is to sandwich the fiber agglomerate distribution layer 10c having an acceptable porosity provided by the present invention. Before the second cloth layer 12 is covered on to the fiber agglomerate distribution layer 10c or after the second cloth layer 12 covers and adheres to the fiber agglomerate distribution layer 10c, the depressing strips 31a, 31b shall be removed from the operational platform 3 so that the following operations can be performed to move the composite warm-keeping textile structure 1.

Figure 6A:
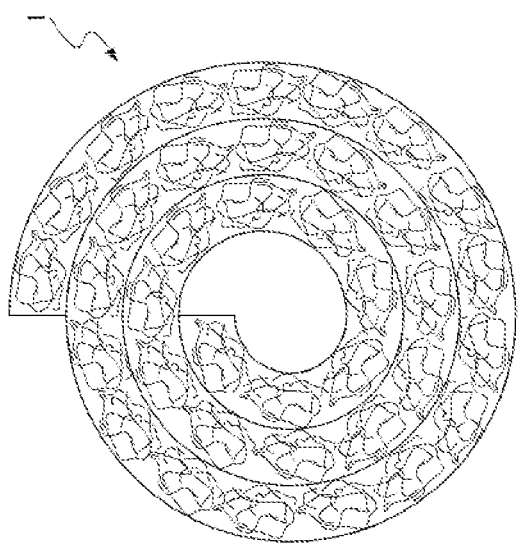
FIG. 6A shows a reel state of the composite warm-keeping textile structure in accordance with the present invention.
Figure 6B:
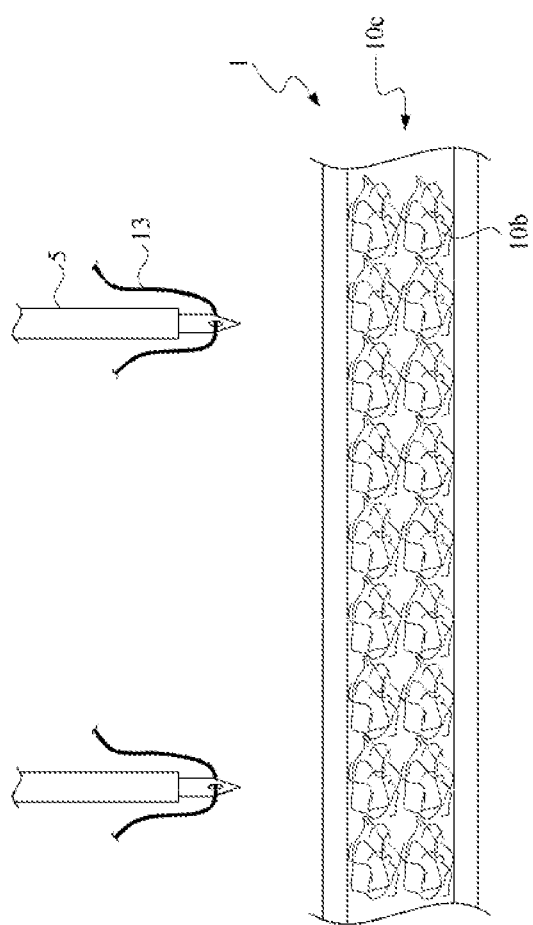
FIG. 6B shows the composite warm-keeping textile structure of the present invention is to be machine sewed.

Finally, refer now to FIG. 6A, FIG. 6B and FIG. 6C; where FIG. 6A shows a reel state of the composite warm-keeping textile structure in accordance with the present invention, FIG. 6B shows the composite warm-keeping textile structure of the present invention is to be machine sewed, and FIG. 6C shows a state of the composite warm-keeping textile structure after the machine sewing of FIG. 6B. As shown, the composite warm-keeping textile structure 1 is stored in a reel manner and then moved to a machine sewing area for at least one machine sewing module 5 to perform thereon the machine sewing. In details, to store and to move the composite warm-keeping textile structure 1 in a reel manner can effectively prevent the fiber agglomerate distribution layer 10c to be squeezed and further accidently to reduce the bulkiness and porosity.

Then, by having the machine sewing module 5 to sew the composite warm-keeping textile structure 1 arranged in a planar form, at least one machine sewing thread 13 would be formed to divide the composite warm-keeping textile structure 1 into a plurality of fiber agglomerate distribution regions A. in the present invention, the purpose of the plurality of fiber agglomerate distribution regions A is to form a restriction for the unit fiber agglomerates 10b to be confined in specific small regions so that the uniformity of the fiber agglomerate distribution layer 10c can be better preserved.

Further, refer to FIG. 6C and FIG. 6D, in which FIG. 6D shows schematically a perspective view of FIG. 6C. As shown, the composite warm-keeping textile structure 1 includes a first cloth layer 11, a fiber agglomerate distribution layer 10c, a second cloth layer 12 and at least one machine sewing thread 13. The fiber agglomerate distribution layer 10c is adhered to the first cloth layer 11, and consists of a plurality of unit fiber agglomerates 10b. The second cloth layer 12 adhered to the fiber agglomerate distribution layer 10c is to sandwiched the fiber agglomerate distribution layer 10c between the first cloth layer 11 and the second cloth layer 12. It is noted that the first cloth layer 11 and the second cloth layer 12 exist in a manner of maintaining the bulkiness and porosity of the fiber agglomerate distribution layer 10c, so that the fiber agglomerate distribution layer 10c can be compactly clamped in between. The machine sewing thread 13 is to divide the combination of the first cloth layer 11, the fiber agglomerate distribution layer 10c and the second cloth layer 12 into a plurality of fiber agglomerate distribution regions A.

In summary, the composite warm-keeping textile structure and the method for manufacturing the composite warm-keeping textile structure provided by the present invention is to introduce the elastic gripper-puffing mechanism to perform the puffing operation upon the opened cotton fiber, so that the puffy fiber agglomerate can be formed. Further, by using the elastic gripper-puffing mechanism to grab and the drop the puffy fiber agglomerate, the unit fiber agglomerate can be formed and can be placed on the first cloth layer prepared on the operational platform. In addition, by vibrating the operational platform to evenly distribute the unit fiber agglomerates on the first cloth layer, the fiber agglomerate distribution layer can be uniformly prepared. Finally, the second cloth layer covers and is adhered to the fiber agglomerate distribution layer so as to complete the sandwiching, in a lamination form, of the first cloth layer, the fiber agglomerate distribution layer, and the second cloth layer, such that the composite warm-keeping textile structure is formed. Further, the composite warm-keeping textile structure can be stored and moved (to the machine sewing area) in a reel manner, and then can be machine sewed into a plurality of fiber agglomerate distribution regions by the at least one machine sewing module.

By comparing to the prior art, the composite warm-keeping textile structure and the method for manufacturing method the same product utilize the elastic gripper-puffing mechanism to perform the puffing operation upon the opened cotton fibers so as thereby to increase the bulkiness and porosity of the opened cotton fibers. Thereupon, the air amount contained in the opened cotton fibers can be increased. Further, by vibrating or providing perturbations to the operational platform, the unit fiber agglomerate thereon can be evenly distributed to form the fiber agglomerate distribution layer without the harmful squeezing. In the circumstance of preserving the bulkiness and porosity in the fiber agglomerate distribution layer, the second cloth layer can be adhered over the fiber agglomerate distribution layer. By having the composite warm-keeping textile structure to be reeled for storage and moving, the bulkiness and porosity of the fiber agglomerate distribution layer can again be well preserved without further squeezing to harm this warm-keeping feature of the present invention.

By introducing the aforesaid composite warm-keeping textile structure in accordance with the present invention, the shortcomings of the prior art described in the background section can be resolved by waiving possible squeezing in forming the fiber-filling textile structure which would reduce the bulkiness and porosity of the textile. In addition, by providing the puffing operation and vibrating at the operational platform, the problem of unevenness in forming the fiber-filling textile structure and further that of patterning the clothes using the textile structure can be successfully eliminated.

While the present invention has been particularly shown and described with reference to a preferred embodiment, it will be understood by those skilled in the art that various changes in form and detail may be without departing from the spirit and scope of the present invention.

What is claimed is:

1. A method for manufacturing a composite warm-keeping textile structure, comprising the steps of:
    (a) applying an elastic gripper-puffing mechanism to perform a plurality of puffing operations upon a plurality of opened cotton fibers in a puffing work area so as to form at least one puffy fiber agglomerate;
    (b) applying the elastic gripper-puffing mechanism to grab a plurality of unit fiber agglomerates from the puffy fiber agglomerate and further to drop the plurality of unit fiber agglomerates onto a first cloth layer prepared on an operational platform;
    (c) vibrating the operational platform so as to have the plurality of unit fiber agglomerates to be evenly distributed over the first cloth layer, so that the plurality of unit fiber agglomerates is formed as a fiber agglomerate distribution layer adhered onto the first cloth layer; and
    (d) having a second cloth layer to cover and be adhered to the fiber agglomerate distribution layer, so that the first cloth layer and the second cloth layer clamps together the fiber agglomerate distribution layer in between to forming a composite warm-keeping textile structure.

2. The method for manufacturing a composite warm-keeping textile structure of claim 1, posterior to the Step (d), further including a Step of:

(e) Machine sewing the composite warm-keeping textile structure, and applying at least one machine sewing thread to divide the composite warm-keeping textile structure into a plurality of fiber agglomerate distribution regions.

3. The method for manufacturing a composite warm-keeping textile structure of claim 1, wherein the Step (a) further includes the Steps of:
- (a1) mounting the elastic gripper-puffing mechanism, the elastic gripper-puffing mechanism including a gripper-limiting member and a movable assembly, the gripper-limiting member having a gripper-limiting opening, the movable assembly including a displacement shaft and a plurality of spring grippers connected to a free end of the displacement shaft, the plurality of spring grippers defining a gripping area;
- (a2) driving at least one of the gripper-limiting member and the displacement shaft to have the displacement shaft to move with respect to the gripper-limiting member along a displacement path passing through the gripper-limiting opening, the displacement path including a material-gripping stroke and a material-releasing stroke;
- (a3) while the displacement shaft undergoes the material-gripping stroke, the gripper-limiting member increasing bending deformations of the spring grippers so as to approach the spring grippers toward the gripping area and to grab the opened cotton fibers in the the puffing work area;
- (a4) while the displacement shaft undergoes the material-releasing stroke, the gripper-limiting member decreasing the bending deformations of the spring grippers so as to open the spring grippers away the gripping area and to pull apart the opened cotton fibers; and
- (a5) repeating Step (a2) to Step (a4) several times so as to perform a plurality of the puffing operations.

4. The method for manufacturing a composite warm-keeping textile structure of claim 3, wherein the Step (a1) further includes a Step of:
- (a11) while in mounting the elastic gripper-puffing mechanism, a driving module of the elastic gripper-puffing mechanism being connected with at least one of the gripper-limiting member and the displacement shaft;
- wherein the driving module is one of a hydraulic tank, a pneumatic cylinder and a robot arm.

5. The method for manufacturing a composite warm-keeping textile structure of claim 4, wherein the Step (a2) further includes a Step of:
- (a21) applying the driving module to drive at least one of the gripper-limiting member and the displacement shaft to move along the displacement path.

6. The method for manufacturing a composite warm-keeping textile structure of claim 1, wherein the Step (b) further includes a Step of:
- (b1) applying a guide mechanism to guide the elastic gripper-puffing mechanism to move to a position over the operational platform so as to allow the plurality of unit fiber agglomerates to be dropped onto the first cloth layer.

7. A composite warm-keeping textile structure, comprising:
- a first cloth layer;
- a fiber agglomerate distribution layer, adhered to the first cloth layer, consisted of a plurality of unit fiber agglomerates; and
- a second cloth layer, adhered to the fiber agglomerate distribution layer, so as to form a laminated sandwich structure having the first cloth layer, the fiber agglomerate distribution layer and the second cloth layer.

8. The composite warm-keeping textile structure of claim 7, further including at least one machine sewing thread for dividing a combination of the first cloth layer, the fiber agglomerate distribution layer and the second cloth layer into a plurality of fiber agglomerate distribution regions.

9. The composite warm-keeping textile structure of claim 7, wherein the unit fiber agglomerate is formed by a plurality of cellosilk entangling together.

10. The composite warm-keeping textile structure of claim 9, wherein the cellosilk is a hollow polyester cellosilk.

11. The composite warm-keeping textile structure of claim 9, wherein the cellosilk has a length between 3 and 15 centimeters.

* * * * *